(12) United States Patent
Matthew

(10) Patent No.: US 6,367,841 B1
(45) Date of Patent: Apr. 9, 2002

(54) MUDGUARD ASSEMBLY

(76) Inventor: George Alexander Matthew, 2 Station Road, Muthill, Crieff, PH5 2AR (GB)

( * ) Notice: Subject to any disclaimer, the term of this patent is extended or adjusted under 35 U.S.C. 154(b) by 0 days.

(21) Appl. No.: 09/386,774

(22) Filed: Aug. 31, 1999

(51) Int. Cl.[7] .................. B62D 25/16; B62D 25/18
(52) U.S. Cl. ............................. 280/847; 280/154
(58) Field of Search ..................... 280/847, 152.1, 280/152.3, 848, 153.5, 851, 852, 159, 154, 160

(56) References Cited

U.S. PATENT DOCUMENTS

| | | | | |
|---|---|---|---|---|
| 336,600 A | * | 2/1886 | Tennent | 280/152.1 |
| 481,053 A | * | 8/1892 | Owen | 280/152.1 |
| 1,147,256 A | * | 7/1915 | Marion | 280/848 |
| 1,730,733 A | * | 10/1929 | Judd | 280/847 |
| 1,854,174 A | * | 4/1932 | Bowman | 280/847 |
| 1,899,937 A | * | 3/1933 | Brown | 280/847 |
| 2,010,450 A | * | 8/1935 | Anderson | 280/152.1 |
| 2,023,128 A | * | 12/1935 | Ferris | 280/152.1 |
| 2,528,683 A | * | 11/1950 | Bowman et al. | 280/847 |
| 2,562,835 A | * | 7/1951 | Ulinski | 188/2 |
| 3,103,369 A | * | 9/1963 | Gaines et al. | 280/152.1 |
| 3,784,226 A | | 1/1974 | Wilfert et al. | 280/157 |
| 4,325,563 A | * | 4/1982 | Brandon et al. | 280/154 |
| 4,377,294 A | * | 3/1983 | Lockwood et al. | 280/851 |
| 4,735,428 A | * | 4/1988 | Antekeier | 280/154 |
| 5,269,547 A | * | 12/1993 | Antekeier | 280/154 |
| 5,460,411 A | | 10/1995 | Becker | 280/851 |
| 6,007,102 A | * | 12/1999 | Helmus | 280/849 |
| 6,152,469 A | * | 11/2000 | Gadowski | 280/154 |

FOREIGN PATENT DOCUMENTS

| | | |
|---|---|---|
| GB | 1 526 212 | 9/1978 |
| GB | 2 035 932 | 6/1980 |

* cited by examiner

*Primary Examiner*—Brian L. Johnson
*Assistant Examiner*—Bridget Avery
(74) *Attorney, Agent, or Firm*—Ratner & Prestia

(57) ABSTRACT

A mudguard assembly for heavy goods vehicles. A moulded mudguard, sized to envelop more than 50% of the upper part and rear of an outer tyre of the vehicle is mounted on two rods engageable in sockets bolted to the chassis of the vehicle. The assembly includes a quick release mechanism to enable ease of installation and of removal of the mudguard for access.

10 Claims, 7 Drawing Sheets

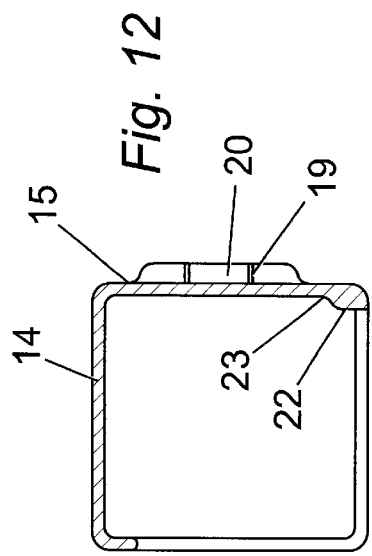
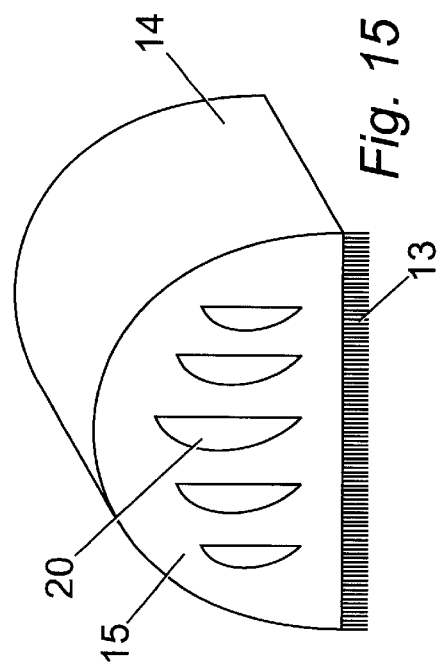
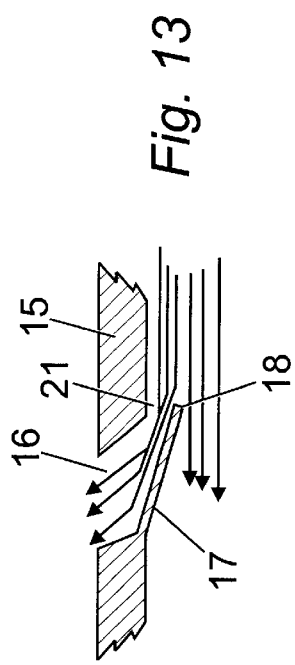
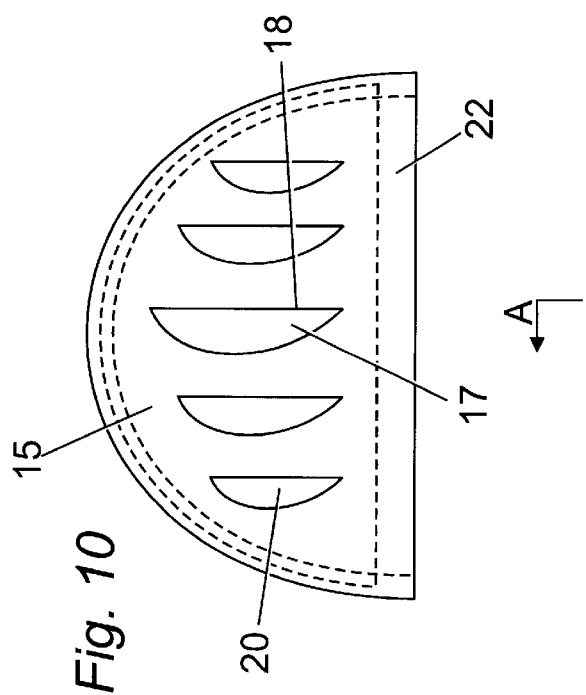
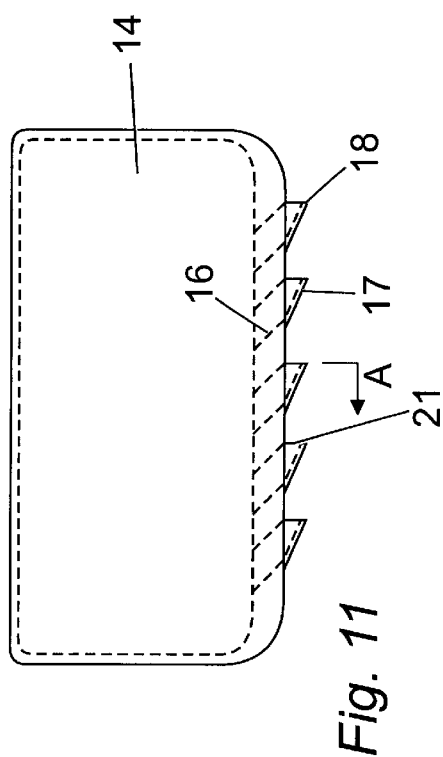

MUDGUARD ASSEMBLY

This invention relates to a mudguard assembly and in particular to a mudguard assembly for heavy goods vehicles and trailers.

FIELD OF INVENTION

BACKGROUND OF INVENTION

Each outer tyre of a heavy goods vehicle or trailer has a basic cover or mudguard parallel to the top of the tyre. The purpose of this cover is to reduce the spray thrown up from a wet road by an uncovered tyre. The cover reduces spray from the rear of the tyre by a small percentage, but does not preclude spray from the sides of the tyre.

A device known as a spat is sometimes used in conjunction with the conventional mudguard described above. A spat is attachable to the outside of a mudguard by means of small clips. A spat has the disadvantages that is not robust, and that is prone to detach in transit. Thus, far from being an improvement, such spats are obviously & potential hazard for road users.

BRIEF SUMMARY OF THE INVENTION

Accordingly the present invention provides a mudguard assembly for use in association with a single wheel or multi-wheel arrangement of a vehicle, said mudguard assembly comprising a unitary mudguard adapted to shroud both the upper part of the circumference of the wheel or wheels and the upper part of the outer face of the wheel or outer wheel.

Preferably the mudguard envelops at least 50% of the tyre of the single wheel, or of the tyre of the outer wheel of a multi-wheel arrangement. More preferably the mudguard envelops 65 to 70% of the tyre of the single wheel or of the tyre of the outer wheel of the wheel arrangement.

The mudguard may comprise a skirt attached along at least part of its lower edge. Preferably the mudguard comprises a skirt attached along its front, outer and rear lower edges. Typically the skirt comprises bristles.

Preferably the assembly further comprises means for releasably securing the mudguard to the frame of the vehicle adjacent the wheel or wheels.

Typically the means for releasably securing the mudguard comprises a quick release arrangement. The quick release arrangement may in one form comprise a rod fixed to the mudguard securable in a socket secured to the vehicle frame. More preferably the quick release arrangement may in one form may comprise a pair of rods fixed to the mudguard securable in a pair of sockets secured to the vehicle frame.

Preferably the or each rod has a circumferential groove engageable in the corresponding socket by a spring loaded pin.

The unitary mudguard is preferably an integral plastics moulding, but may alternatively be a metal pressing or fabrication.

BRIEF DESCRIPTION OF THE DRAWINGS

Embodiments of the present invention will now be described by way of example only with reference to the accompanying drawings in which:

FIG. 10 is a side elevation of a mudguard assembly according to an embodiment of the invention comprising vents;

FIG. 11 is a plan view of the mudguard assembly of FIG. 10;

FIG. 12 is a cross section through line A—A of FIG. 11;

FIG. 13 is a plan view of a detail of an vent of the embodiment of FIG. 10, showing the direction of air flow;

FIG. 15 is a perspective view an embodiment of the assembly of FIG. 10 which includes a skirt.

DETAILED DESCRIPTION OF THE INVENTION

Figure 1:
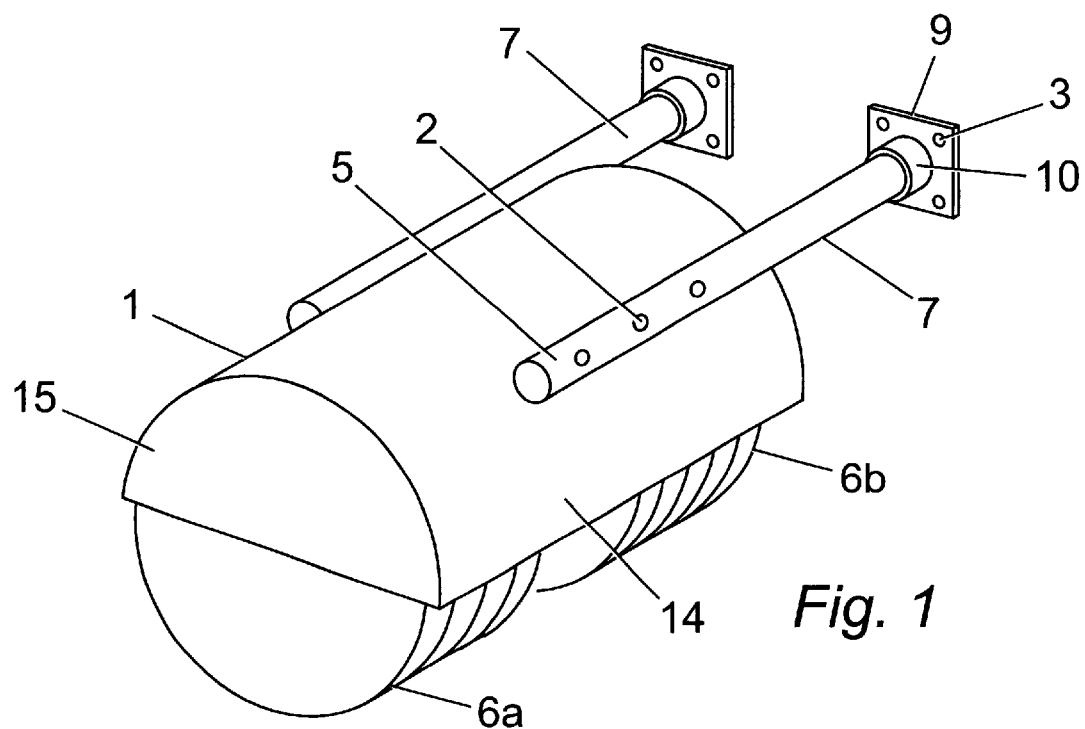
FIG. 1 is a perspective view of a mudguard assembly of the present invention in situ on a vehicle.
Figure 2:
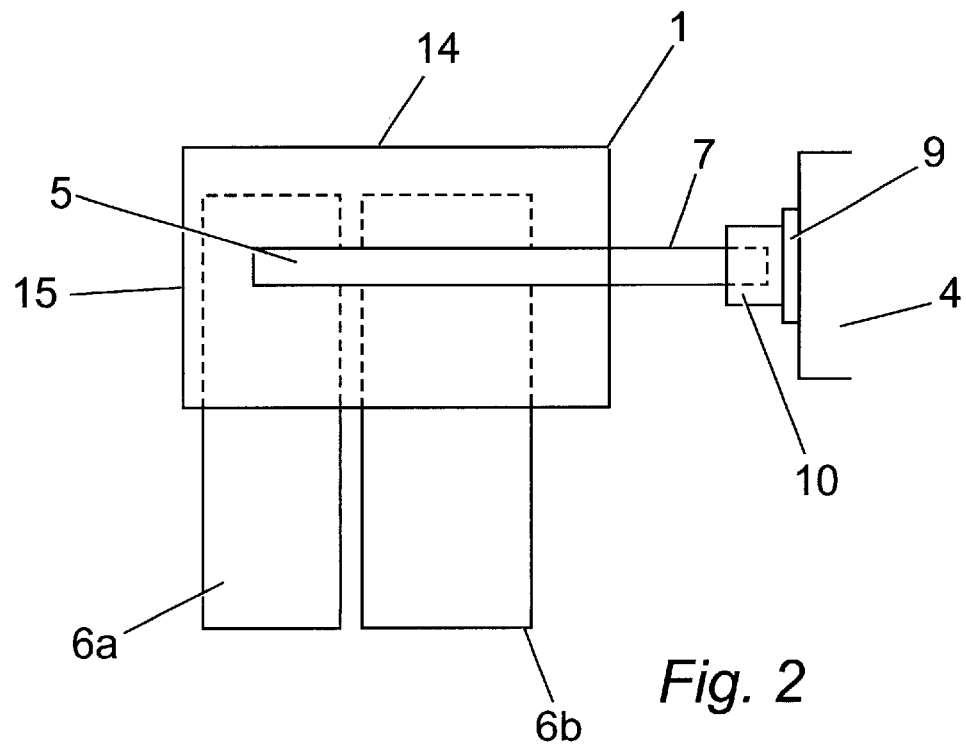
FIG. 2 in a rear view of mudguard assembly of FIG. 1.
Figure 3:
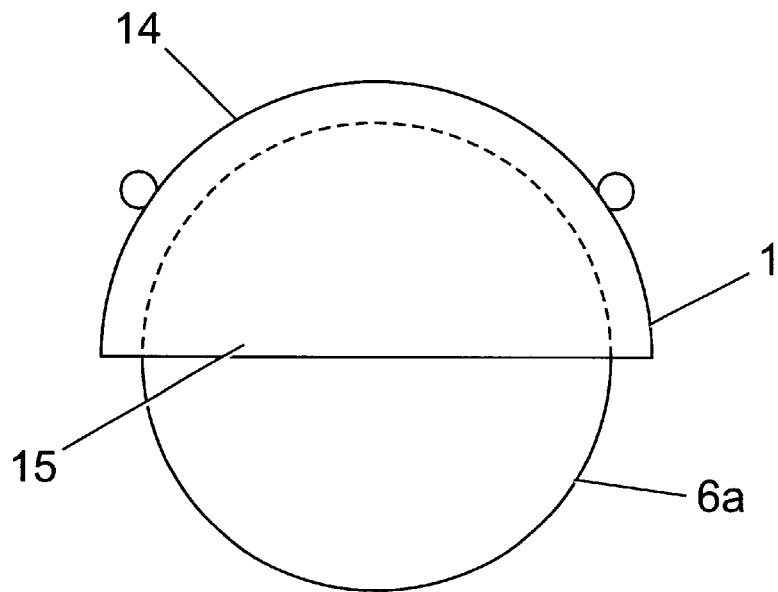
FIG. 3 is a side elevation of the mudguard assembly of FIG. 1.
Figure 4:
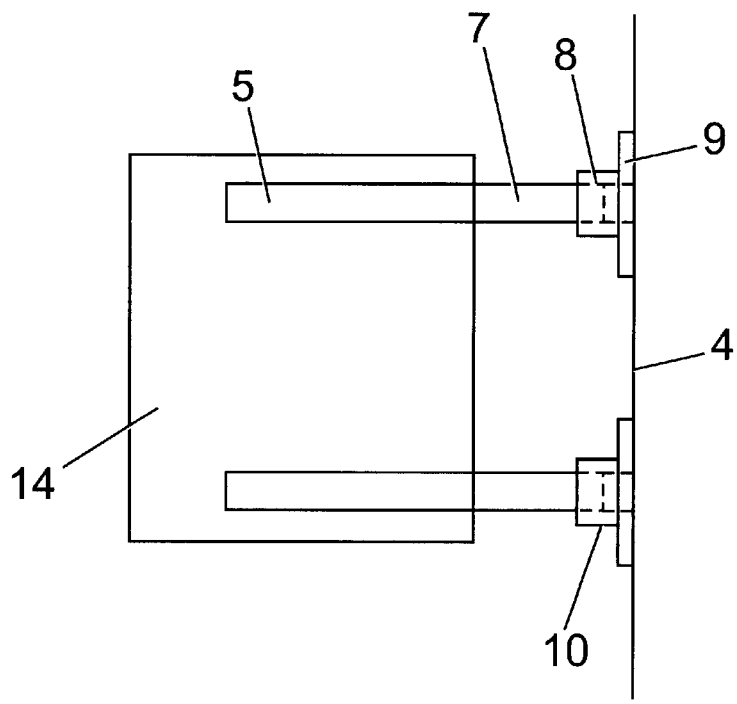
FIG. 4 is a plan view of the mudguard assembly of FIG. 1.

Referring to the drawings, a mudguard assembly comprises a mudguard 1 which envelops more than 50% of the outer tyres 6a of a vehicle having a twin wheel arrangement. In the embodiment of FIG. 1 the mudguard 1 envelops 65% to 70% of the outer tyre of the assembly. The mudguard 1 comprises a top portion 14 adapted to provides cover over the upper part of the circumference of the tyres 6a 6b, and a side wall 15 adapted to provide cover over the upper part of the outer face of the outer tyre 6a.

The mudguard assembly further comprises a quick release mechanism to allow quick removal of the mudguard 1 for ease of access to change the wheels 6a, 6b, or for any other purpose.

Figure 5:
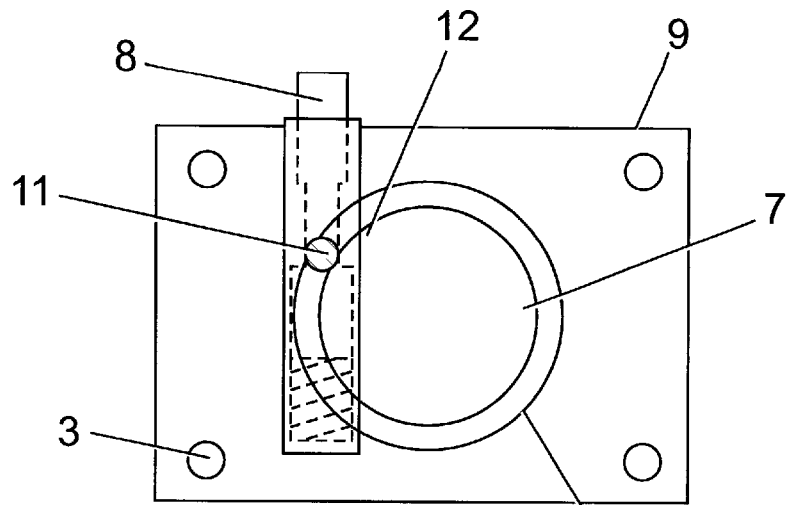
FIG. 5 is a front elevation of an engagement mechanism forming part of the assembly of FIG. 1, in locked position.
Figure 6:
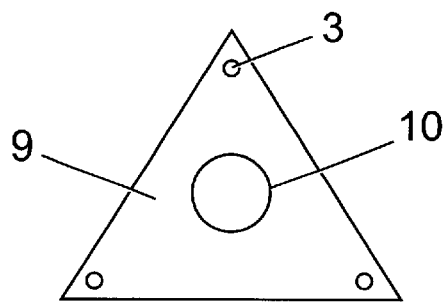
FIG. 6 is a front elevation of an alternative embodiment of the base of the engagement mechanism of the assembly.
Figure 7:
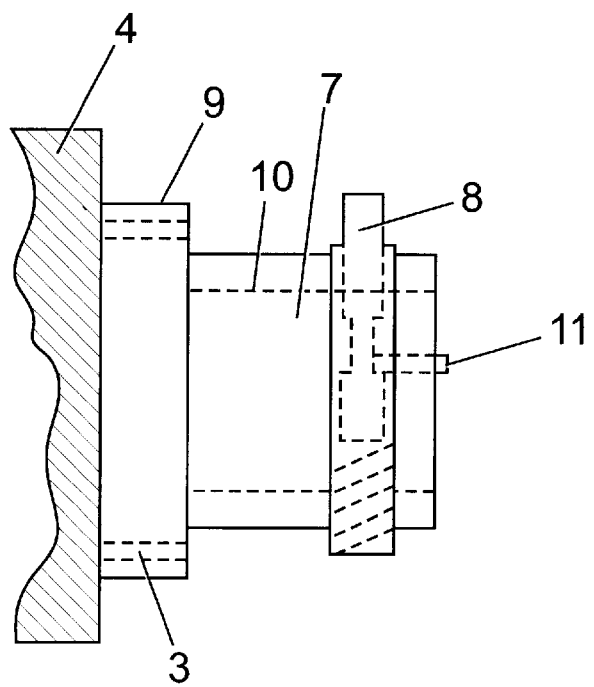
FIG. 7 is a side elevation of the engagement mechanism of FIG. 5.
Figure 8:
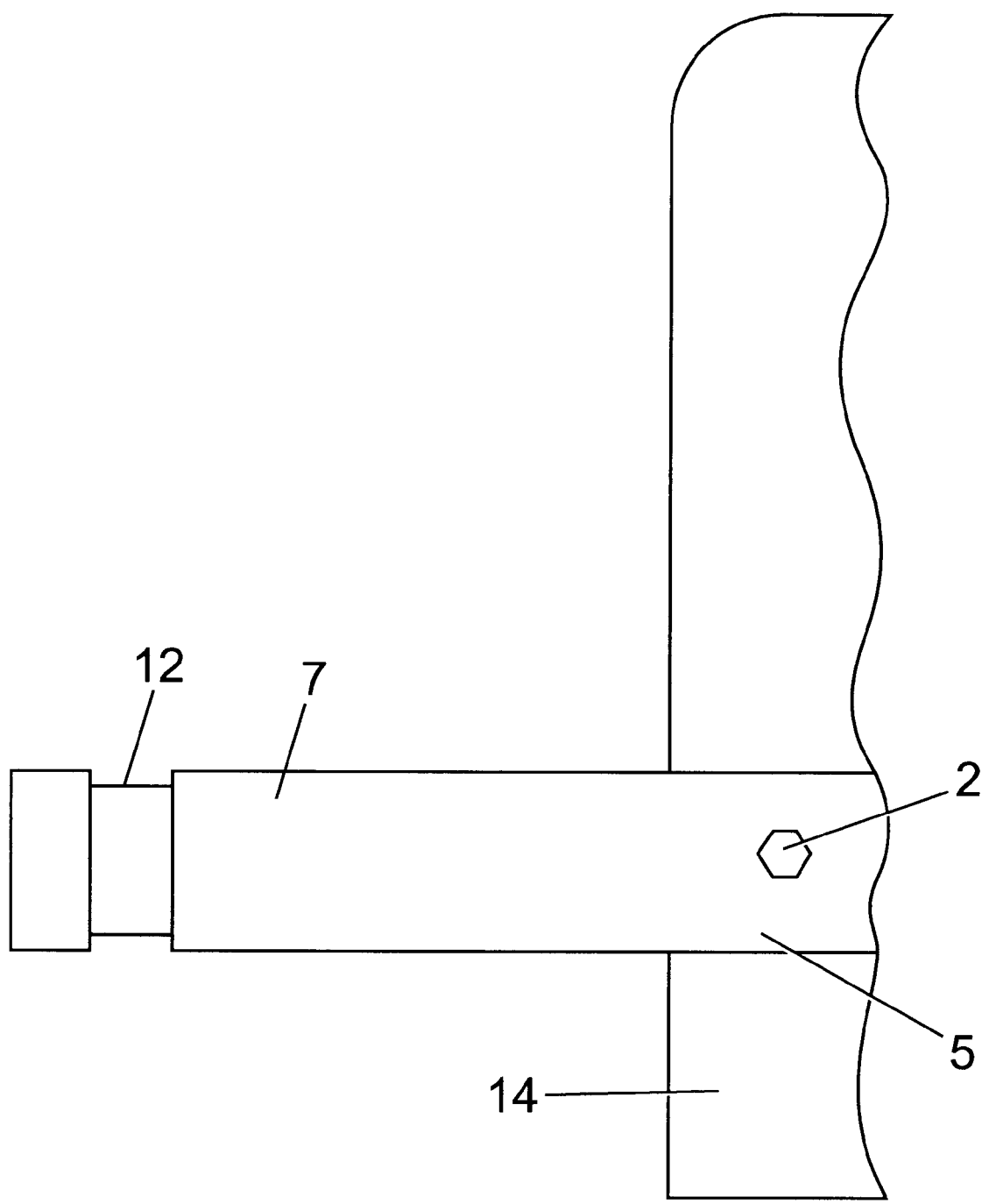
FIG. 8 is a plan view of a rod of the assembly.
Figure 9:
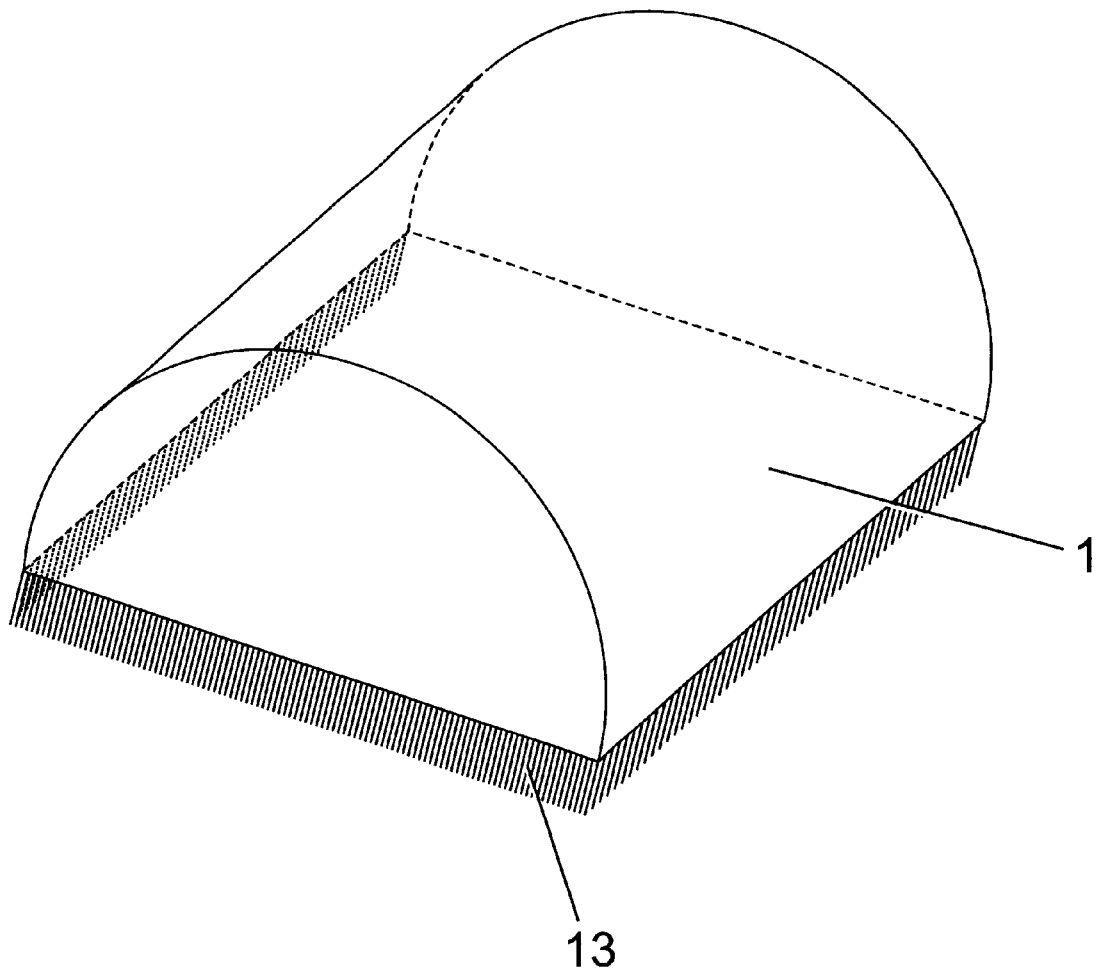
FIG. 9 is a perspective view of an embodiment of the mudguard of the assembly which includes a skirt.
Figure 14:
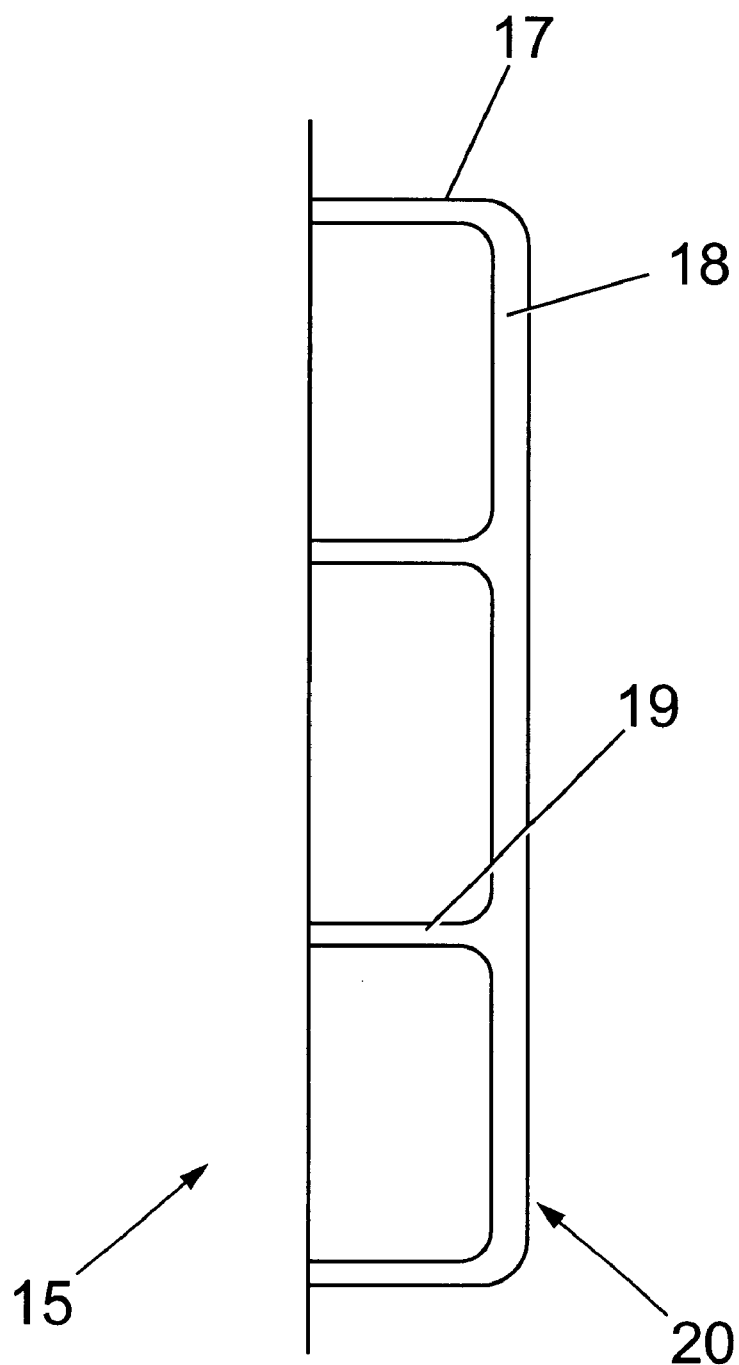
FIG. 14 is a front view of a derail of the vent of the embodiment of FIG. 10 showing its stuctural support members.

The quick release mechanism comprises a rod 7. The quick release mechanism of the embodiment of FIG. 1 comprises two rods 7. The quick release mechanism further comprises a flat steel base 9 corresponding to each rod 7 which is secured to the chassis 4 of a vehicle by means of bolts 3. The mechanism (illustrated in FIG. 5 in locked position) further comprises a hollow boss 10 projecting from the base 9 and a spring loaded pin 8 moulded into the mechanism.

Each rod 7 is engageable in the corresponding base 9. Each rod 7 may be secured in the boom 10 of the corresponding base 9 by the spring loaded pin 8. Each rod 7 has a machined slot 12 in which the spring loaded pin 8 is engageable.

Each rod 7 is connected to a strip of steel 5 which attached by means of bolts 2 to the mudguard 1.

When the rod 7 is positioned in the boss 10, engagement between the spring loaded pin 8 and rod 7 forms a lock and stabilises the mechanism. Once the rod 7 has been secured by means of the spring loaded pin 8, the spring loaded pin a is secured in position by a locking pin 11.

The section of the rod 7 which locks into the locking mechanism suitably has a minimum length of 80 mm.

For quick removal of the mudguard 1 for access the security pins 11 are removed, and the spring loaded pins 8 depressed. This clears the spring loaded pins 8 from the machined slots 12 in the rods 7. The rods 7 and the attached mudguard 1 are released, and can be removed.

To reinstall the mudguard 1, the rods 7 are pushed into position in the bosses 10. The spring loaded pins 8 click into the machined slots 12 of the rods 7 and lock the rods 7 in position. The security pins 11 are then replaced to secure the spring loaded pins 8.

The mudguard 1 further comprises an air flow enhancement system to ensure that, when the assembly is installed, the tyres, brakes and all associated fittings are cooled, and kept cool, during use of the vehicle. The air flow enhancement system thus ventilates the tyres 6a, 6b and associated fittings, Specifically the mudguard 1 comprises a number of air vents 20 in spaced array on its side wall 15. The vents 20 are of height approximately equivalent to 50% of the height of the wall 15 at the location of the vent 20, Whilst variations in height of the vents 20 are possible in different embodiments of the assembly, test results show that vents 20 of approximately half the height of the wall 15, are most effective.

Each vent 20 comprises an opening 16 in the wall 15 and a protruding member 17 which extends outwardly from the wall 15 at an acute angle to the wall 15 so that it has a leading edge 18 which is spaced apart from the wall 15. The distance between the leading edge 18 and the wall 15 is approximately 1".

The member 17 is shaped to curve from its leading edge 18 towards the wall 15. The member 17 covers the opening 16. The member 17 is strengthened internally by a number of horizontal support members 19, spaced at intervals of approximately 4".

The vent 20 further comprises an inlet 21 defined by the leading edge 18 of the member 17 and the wall 15.

A further support member 22 in the form of a horizontal bar 22 of thickness approximately treble that of the wall 15 is fitted to the inner surface 23 of the wall 15 below the vents 20. This bar 22 runs substantially the length of the wall 15. The bar 22 strengthens the mudguard 1. The combined purpose of the support members 19, 22 is to strengthen the structure of the mudguard 1 and to prevent mis-shaping. The protruding member 17 and the support members 19, 22 are constructed of the same material as the mudguard 1.

The vents 13 are shaped and positioned to direct incoming air towards the wheels 6a, 6b and associated brake assembly when the assembly is in position on a vehicle, and the vehicle is being driven. That is, in use, air flows in through the inlets 21 in direction B and is directed by the protruding member 17 to the tyres 6a, 6b and associated brake assembly. This cooling effect has the combined advantages of increasing the useful life of the tyres, and increasing the safety of the vehicle by maintaining the efficiency of the brakes which would tend to decrease if the brake assembly was allowed to heat.

In one embodiment of the mudguard 1, the mudguard 1 comprises a skirt 13 of bristles or brush material attached to its lower edge 1. The skirt 13 is attached along the lower edge of three sides of the mudguard 1, namely the along the front, outer and rear edges. These bristles are of length of the order of 100 to 150 mm, and extend the mudguard 1 towards the roadway. These bristles act to further reduce spray.

This mudguard assembly, with its mechanism for quick release of the mudguard 1, permits easy access to all moving parts of the vehicle.

The embodiments described may be adapted for use with single wheel or multi wheel arrangements.

This mudguard 1 reduces the amount of spray generated from tyres of a vehicle providing enhanced visibility both for the vehicle operator and other road users.

Modifications and improvements may be made to the foregoing within the scope of the present invention.

What is claimed is:

1. A mudguard assembly for use with a single wheel or multi-wheel arrangement of a vehicle, said mudguard assembly comprising a unitary mudguard adapted to shroud both the upper part of the circumference of the wheel or wheels and the upper part of the outer face of the wheel or outer wheel; and further comprising a quick release arrangement for releasably securing the mudguard to the frame of the vehicle adjacent the wheel or wheels; the quick release arrangement comprising at least one rod fixed to the mudguard and a socket secured to the vehicle frame, the rod being securable in the socket, and the rod having a circumferential groove engageable in the socket by a spring loaded pin.

2. A mudguard assembly according to claim 1 wherein the mudguard envelops at least 50% of a tire of the single wheel arrangement or 50% of a tire of the outer wheel of the multi wheel arrangement.

3. A mudguard assembly according to claim 1 wherein the mudguard envelops 65 to 70% of a tire of the single wheel arrangement or 65 to 70% of the tire of the outer wheel of the multi wheel arrangement.

4. A mudguard assembly according to claim 1 wherein the mudguard comprises a skirt attached along at least part of the lower edge of the mudguard.

5. A mudguard assembly according to claim 1 wherein the mudguard is an integral plastics moulding.

6. A mudguard assembly according to claim 1 wherein the mudguard is a metal pressing or fabrication.

7. A mudguard assembly according to claim 1 wherein the mudguard comprises ventilation means.

8. A mudguard assembly according to claim 1, in which the quick release arrangement comprises a pair of rods fixed to the mudguard and a pair of sockets secured to the vehicle frame, each of the rods being securable in a corresponding one of the sockets, and each of the rods having a circumferential groove engageable in its respective socket by a respective spring loaded pin.

9. A mudguard assembly according to claim 4 wherein said skirt is attached along the front, outer and rear lower edges of the mudguard.

10. A mudguard assembly according to claim 4 wherein said skirt comprises bristles.

* * * * *